(12) United States Patent
Chen et al.

(10) Patent No.: US 10,528,207 B2
(45) Date of Patent: Jan. 7, 2020

(54) CONTENT-BASED INTERACTIVE ELEMENTS ON ONLINE SOCIAL NETWORKS

(71) Applicant: Facebook, Inc., Menlo Park, CA (US)

(72) Inventors: Andrew Yu-ran Chen, San Francisco, CA (US); I Chien Peng, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 755 days.

(21) Appl. No.: 14/594,437

(22) Filed: Jan. 12, 2015

(65) Prior Publication Data

US 2016/0202879 A1    Jul. 14, 2016

(51) Int. Cl.
| | |
|---|---|
| *G06F 3/0481* | (2013.01) |
| *H04L 12/58* | (2006.01) |
| *G06Q 50/00* | (2012.01) |
| *G06F 3/0488* | (2013.01) |
| *G06F 3/0482* | (2013.01) |
| *G06F 3/0486* | (2013.01) |
| *H04L 29/08* | (2006.01) |

(52) U.S. Cl.
CPC .......... *G06F 3/0481* (2013.01); *G06F 3/0482* (2013.01); *G06F 3/0486* (2013.01); *G06F 3/04883* (2013.01); *G06Q 50/01* (2013.01); *H04L 51/32* (2013.01); *H04L 67/02* (2013.01)

(58) Field of Classification Search
CPC .............. G06F 3/0481; G06F 3/04883; G06F 3/04817; G06Q 50/01; H04L 67/02; H04L 51/32; H04L 65/403
See application file for complete search history.

(56) References Cited

U.S. PATENT DOCUMENTS

| | | | | |
|---|---|---|---|---|
| 9,213,754 | B1 * | 12/2015 | Zhang | G06F 17/30867 |
| 2009/0049385 | A1 * | 2/2009 | Blinnikka | G06F 3/0481 |
| | | | | 715/719 |
| 2009/0265213 | A1 * | 10/2009 | Hyman | G06F 17/30035 |
| | | | | 705/59 |

(Continued)

OTHER PUBLICATIONS

Kukde, Shreyas, "Get Chatheads for All Notifications with Floating Notifications", May 17, 2013, DroidViews.com, All pages.*

*Primary Examiner* — Kieu D Vu
*Assistant Examiner* — Roberto Borja
(74) *Attorney, Agent, or Firm* — Baker Botts L.L.P.

(57) ABSTRACT

In one embodiment, a method includes receiving user input (e.g., touch input) selecting a content object displayed in an application on the user's mobile device. The mobile device may then send a request to a social-networking system for content objects and social-networking information related to the selected content object. In response to the user input, the mobile device may provide a persistent display of an interactive element (e.g., a bauble) that corresponds to the selected content object. The interactive element may be displayed, and the user may interact with it, without interfering with the underlying application. The interactive element may float over the application window until the user expands or dismisses it. The user may expand the interactive element to reveal a user interface in which the content object and requested related content objects and social-networking information are presented.

20 Claims, 12 Drawing Sheets

(56) References Cited

U.S. PATENT DOCUMENTS

| | | | |
|---|---|---|---|
| 2012/0233020 A1* | 9/2012 | Eberstadt | G06Q 10/10 705/26.41 |
| 2012/0317498 A1* | 12/2012 | Logan | H04L 51/24 715/752 |
| 2013/0151603 A1* | 6/2013 | Lobb | A63F 13/795 709/204 |
| 2013/0227011 A1* | 8/2013 | Sharma | G06Q 50/01 709/204 |
| 2014/0143228 A1* | 5/2014 | Blue | G06F 17/30867 707/709 |
| 2014/0172965 A1* | 6/2014 | Yerli | G06Q 50/01 709/204 |
| 2015/0134639 A1* | 5/2015 | Salituri | G06F 16/95 707/722 |
| 2015/0363796 A1* | 12/2015 | Lehman | G06Q 30/0201 705/7.29 |
| 2016/0062557 A1* | 3/2016 | Kim | G06F 3/0481 715/748 |
| 2016/0063117 A1* | 3/2016 | Carter | G06F 16/248 707/727 |

\* cited by examiner ated patents.

CONTENT-BASED INTERACTIVE ELEMENTS ON ONLINE SOCIAL NETWORKS

TECHNICAL FIELD

This disclosure generally relates to a user interface, particularly within the context of an online social network.

BACKGROUND

A user interface (UI), in the industrial design field of human-machine interaction, is the space where interactions between humans and machines occur. The goal of the interactions between a human, often referred to as a "user," and a machine at the user interface is the user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands. A user interface may allow users to interact with a social-networking system.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a user viewing an application (e.g., a social-networking application) running on a client system (e.g., a smartphone) may select a displayed content object (e.g., a particular news feed story) from a set of displayed content objects in an interface of the application. The client system may, in response to the received user selection, display to the user, in a persistent fashion, an interactive element that corresponds to the selected content object. The interactive element may function and be displayed independent of the application (e.g., the interactive element may "float" on top of the display of the application). Additionally, the activity of the underlying application on the client system may be unaltered by the interactive element. The interactive element may continue to be displayed until the client system receives user input selecting or dismissing the interactive element (e.g., via a set of gestures on a touch screen of the computing device). In particular embodiments, multiple interactive elements may be displayed on an interface of a client system, and these interactive elements may be displayed in a variety of configurations.

In particular embodiments, in response to a particular user input selecting the interactive element (e.g., press and swipe to a corner of the interface), the client system may open an interactive element interface. As an example and not by way of limitation, the interactive element interface may be a call-out box or pop-up window, which, similar to the interactive element, may function and be displayed independent of the underlying application. In particular embodiments, the interactive element interface provides the selected content object as well as any number of related content objects (e.g., stories in a user's news feed) and social-networking information (e.g., "likes" or comments associated with the selected and related content objects). As an example and not by way of limitation, the interactive element interface may provide a personalized thread of content objects based on the selected content object. In particular embodiments, a social-networking system determines the particular content objects and social-networking information to be provided by the interactive element interface using any suitable technique. As an example and not by way of limitation, related content objects may each correspond to a node in a social graph that is connected (i.e., related) to a node corresponding to the selected content object. The interactive element interface may permit the user to directly interact with the selected content object and the related content objects (e.g., by liking or commenting on a particular content object). In particular embodiments, the interactive element interface is dynamically updated, and the update may occur when the interactive element interface is open or, in the background, when the interactive element interface is closed.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
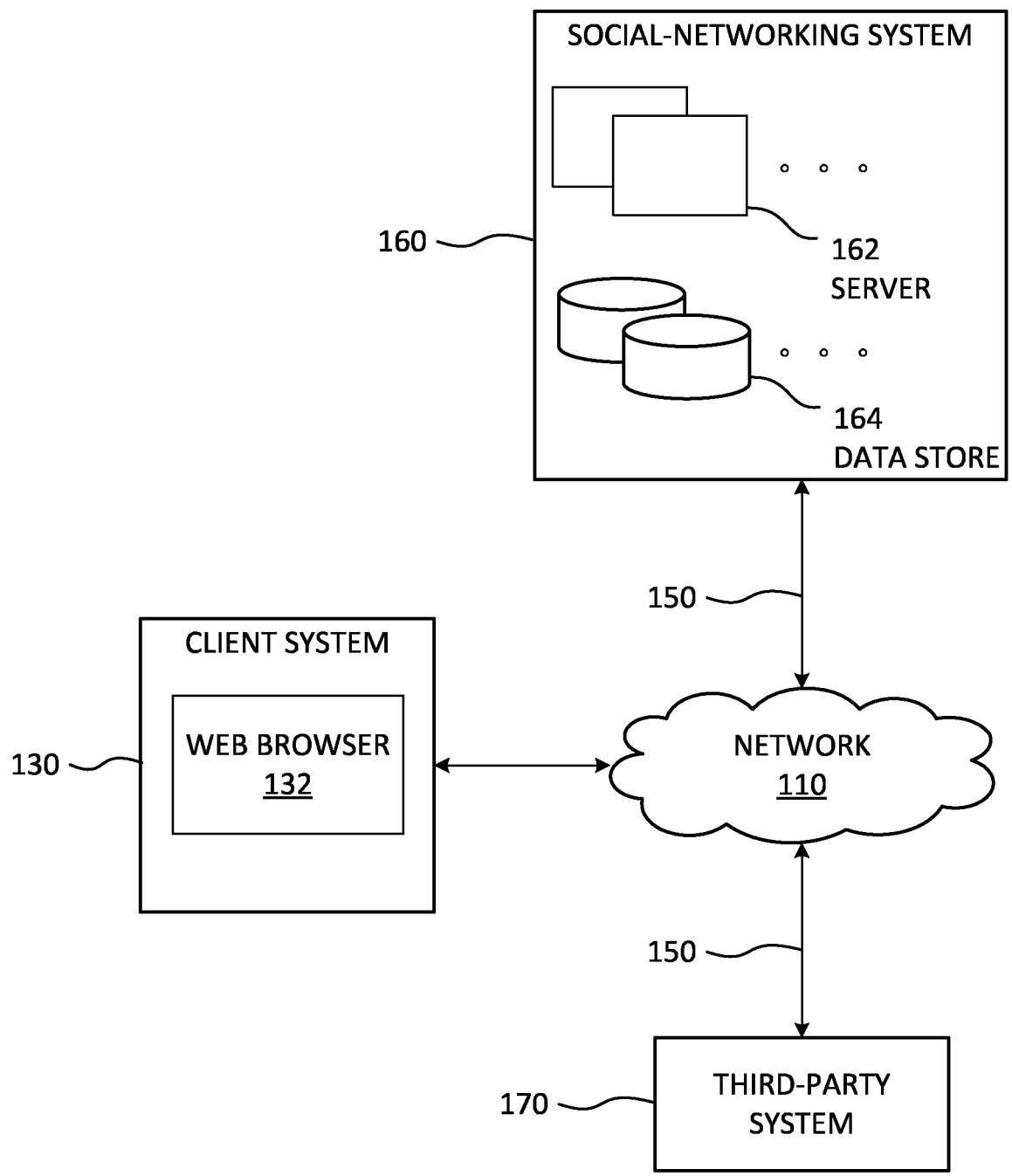
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., with which servers may communicate. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
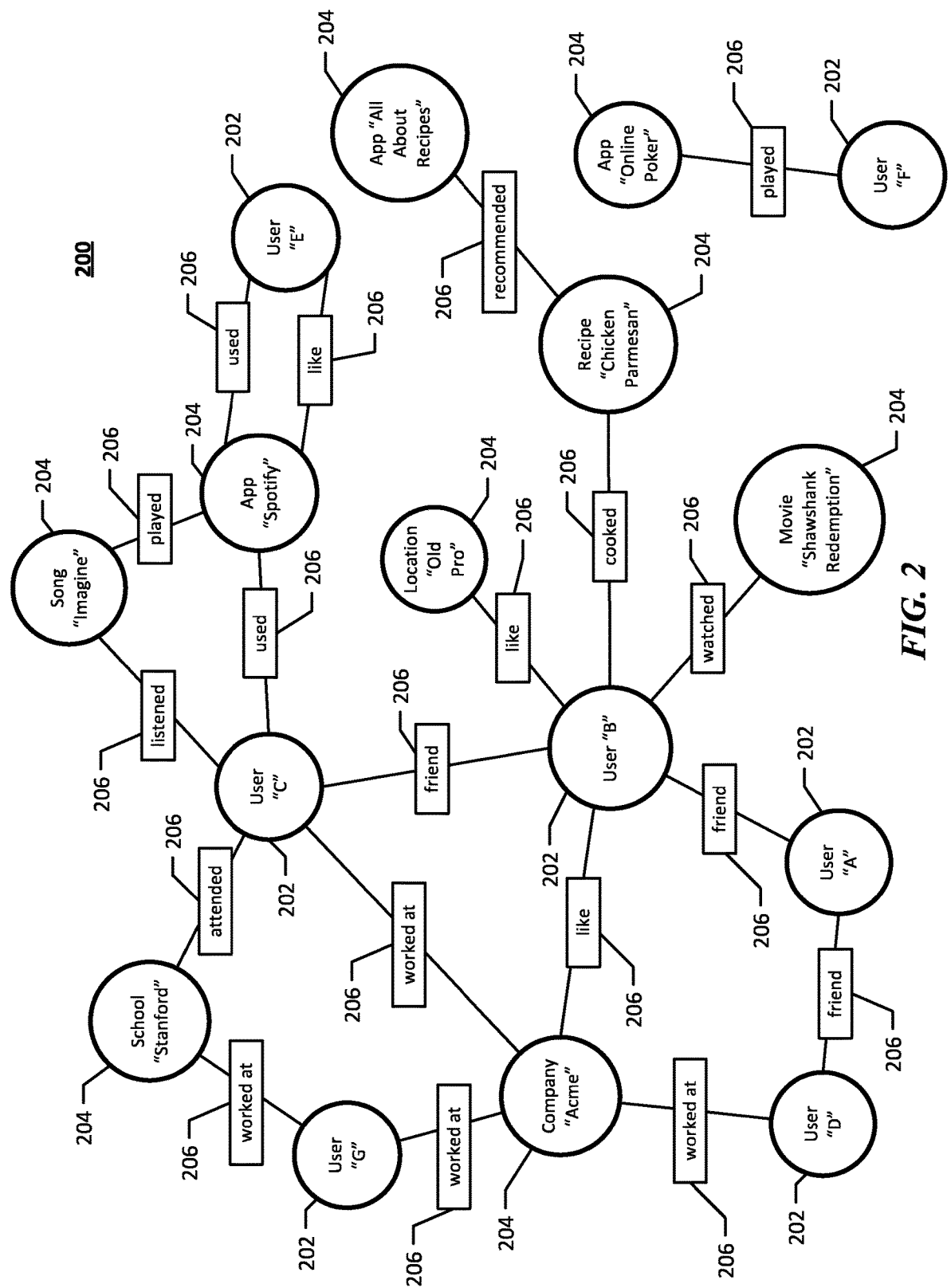
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Interactive Elements

Particular embodiments provide an interactive element corresponding to a content object selected by the user at an interface of an application running on client system 130 (e.g., a smartphone or a tablet computer). As an example and not by way of limitation, social-networking system 160 may generate and send to client system 130 an interactive element for display at an interface of a native application associated with an online social network. Interactive elements may be manually generated in response to user input or automatically generated by social-networking system 160. As an example and not by way of limitation, user input received at client system 130 may include a selection of a particular news feed story of a plurality of news feed stories presented to the user in an interface displayed on client system 130. Content objects may include, as an example and not by way of limitation, posts communicated by one or more users to social-networking system 160 (e.g., status updates or other textual data, location information, photos, videos, links, music or other similar data or media), events, pages, groups, third-party content objects (e.g., movie show times, movie reviews, restaurant reviews, restaurant menus, product information and reviews, or other suitable information), incentive content objects (e.g., coupons, discount tickets, gift certificates, or other suitable incentive objects), sponsored content, any other suitable content that may be represented by social-networking system 160, or any combination thereof. As another example, content objects may include indications of communications received at client system 130 (e.g., emails, Short Message Service (SMS) messages, instant messages, or any other type of message communicated by another user via any suitable communication channel), other content stored locally at client system 130 (e.g., calendar entries, notes, photographs, music, voice memos, videos, contacts, or any other suitable content stored locally), content associated with games, and content associated with applications.

The interactive element may include an image, text, any other suitable identifier of the selected content object, or any combination thereof. The interactive element may be selectable, and upon selection, may expand to reveal an interactive element interface, which may provide for display to the user a personalized set of related content objects (e.g., aggregated stories from a newsfeed). The interactive element interface may also include social-networking information, including, as an example and not by way of limitation, social-networking actions taken by one or more other users with respect to the content objects (e.g., "like," "check in," "follow," "poke," "share," or "comment"). Social-networking system 160 may generate the personalized set of related content objects and social-networking information and send it to client system 130 for display. A user may interact with the content objects and social-networking information displayed in the interactive element interface in any suitable manner (e.g., by "liking" or commenting on a content object or by selecting and being redirect to a hyperlinked address). As an example and not by way of limitation, social-networking system 160 may parse through stories in a news feed of the user to find stories related to a story which the user has expressed interest in (i.e., selected); the related stories are then aggregated and presented to the user in a single interactive element interface, obviating cumbersome manual searching of the news feed, which may contain any number of unrelated material.

Generation and Display of Interactive Elements

Figure 3A:
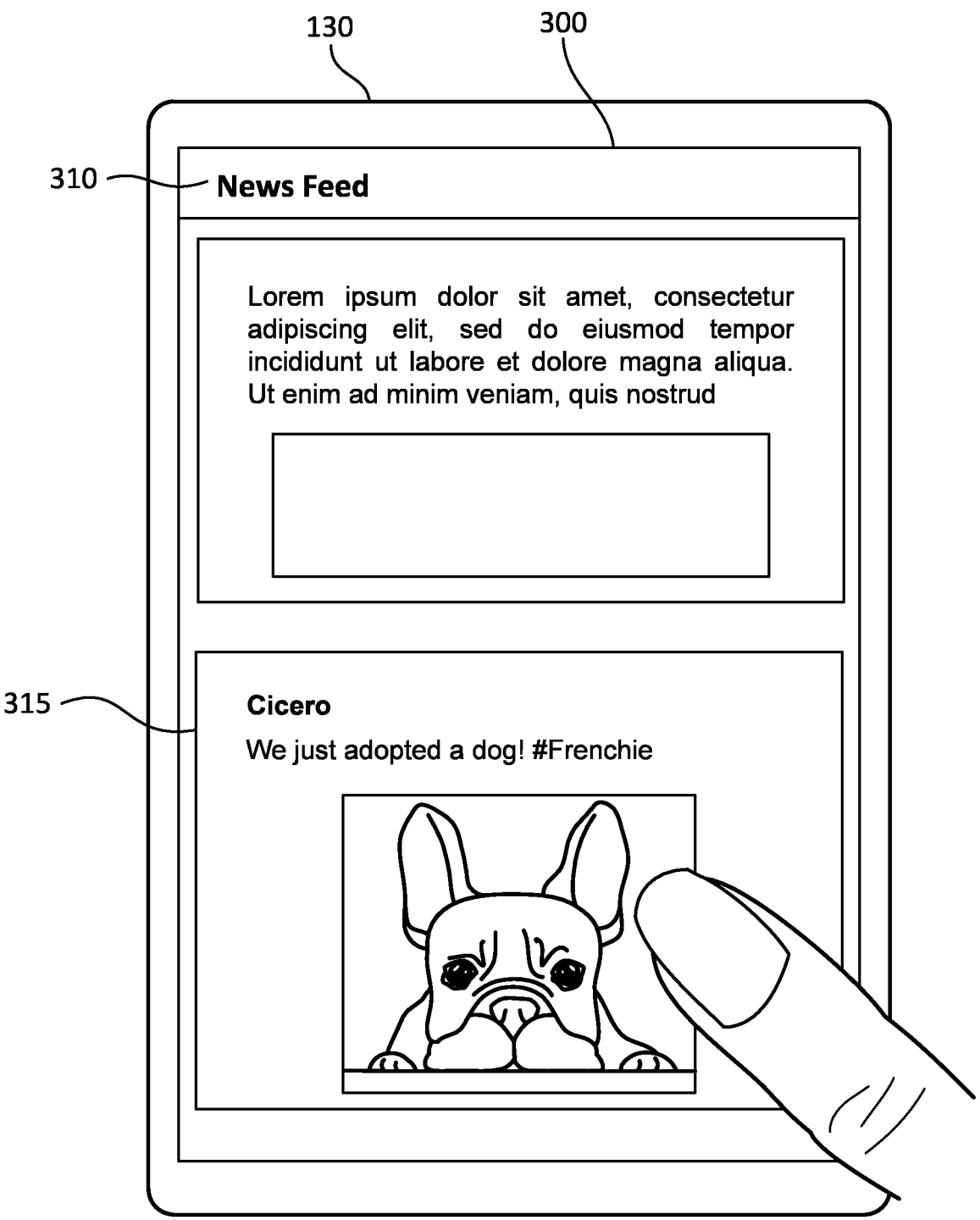
FIG. 3A illustrates an example interface of a client system.

FIG. 3A illustrates an example interface 300 of a client system 130. Interface 300 may provide news feed 310, which may include a personalized set of content objects. News feed 310 may be generated as disclosed in U.S. Pat. No. 7,669,123, "Dynamically providing a news feed about a user of a social network," granted 23 Feb. 2010. Social-networking system 160 may generate news feed 310, which is made accessible to a user of client system 130 via interface 300 of an application running on client system 130 (e.g., a social-networking application). The user may interact with interface 300 using, for example, touch input. Client system 130 may include a touch-screen display, which may incorporate one or more touch sensors and a touch-sensor controller for detecting the presence and location of a touch (e.g., from a finger of the user) or the proximity of an object (e.g., a stylus).

Social-networking system 300 may customize the particular set of content objects presented in news feed 310 to the particular the user. News feed 310 may include any suitable number of content objects, and each content object may be represented in social graph 200 by a respective node. In the example illustrated in FIG. 3A, news feed 310 may include first content object 315, which is depicted as a post made by a user, Cicero, and includes text—"We just adopted a dog! # frenchie"—as well as an image of a French bulldog. Cicero (i.e., the authoring user) and first content object 315 may each be represented in social graph 200 by a respective node. Although first content object 315 is described in a particular manner, this is merely illustrative and not by way of limitation. This disclosure contemplates first content object 315 as including any suitable content authored (i.e., created, published, or otherwise caused to be shown in news feed 310) by any suitable user, group of users, or entity. A predefined user input received at client system 130 and selecting a first content object 315 may cause client system 130 to display an interactive element corresponding to first content object 315, as shown in FIG. 3B.

Figure 3B:
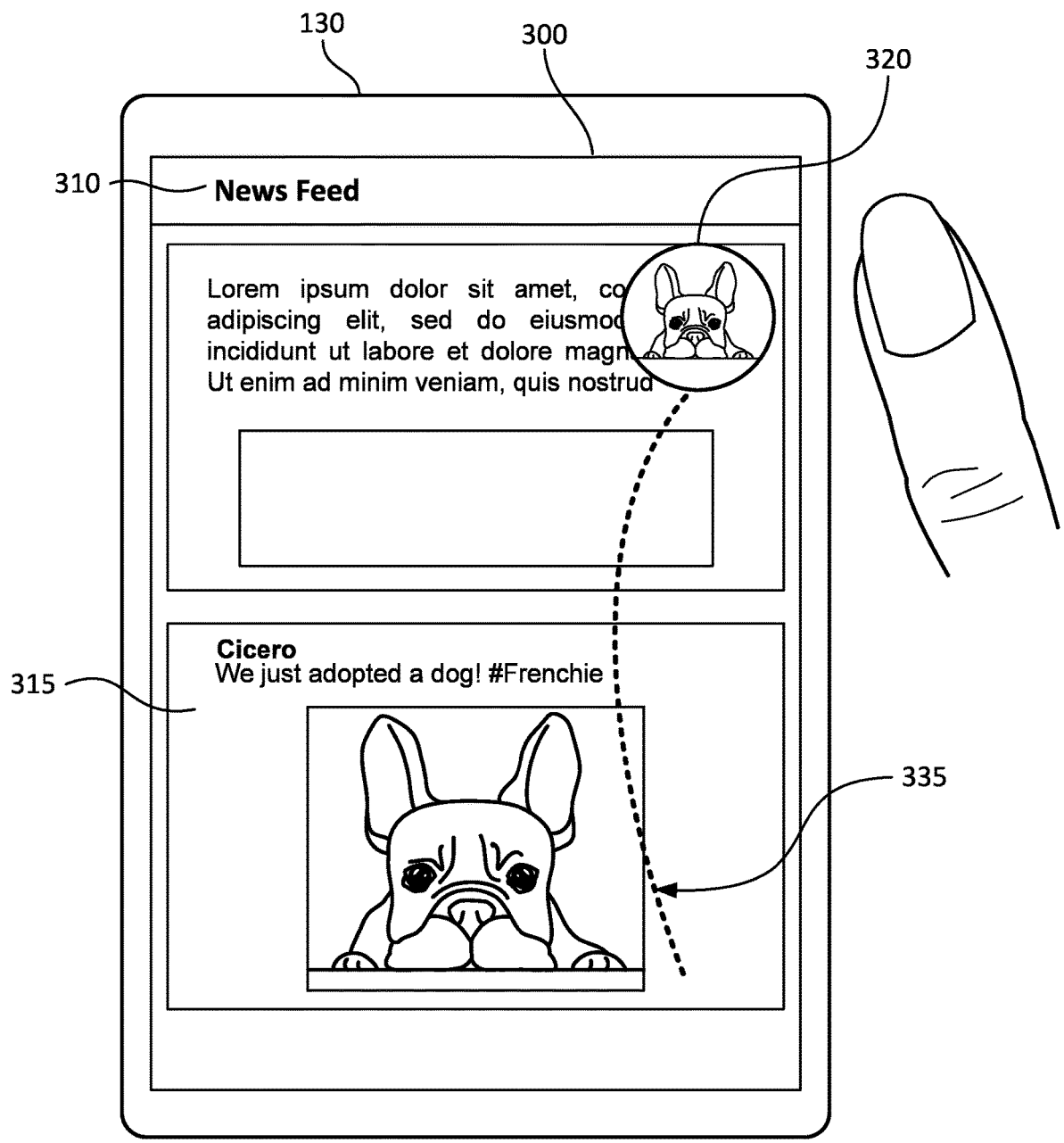
FIG. 3B illustrates example user input received at an interface of a client system for generating an interactive element.

FIG. 3B illustrates example user input 335 received at an interface 300 of a client system 130 for generating an interactive element 320. Client system 130 may receive any suitable user input 335 selecting first content object 315, and, in response, client system 130 may generate interactive element 320. Interactive element 320 may correspond to selected first content object 315. In particular embodiments, interactive element 320 may be generated in response to user input 335 selecting more than one content object (e.g., a plurality of content objects of news feed 310), and interactive element 320 may correspond to the more than one selected content objects. User input 335 may include any suitable type of touch or gesture, including, for example and not by way of limitation, a single tap, double tap, short press, long press, slide, swipe, flip, pinch open, pinch close, any other suitable predefined gesture, or any combination thereof. As an example and not by way of limitation, user input 335 may be a press and drag to the upper right corner of interface 300, as shown in FIG. 3B. The user may customize the particular user input 335 that will generate interactive element 320 in settings of client system 130. Although user input 335 is described herein as touch input, this is merely illustrative and not presented by way of limitation. Any other suitable user input may be used to select first content object 315, including, for example, stylus input, voice input, input received at any other suitable input device (e.g., a keyboard or mouse), or any combination thereof.

In particular embodiments, client system 130 may automatically generate interactive element 320 (i.e., without any user input 335) in response to instructions received from social-networking system 160. Social-networking system 160 may generate and provide instructions for the automatic display of an interactive element 320 to client system 130 based on, as an example and not by way of limitation, a popular or trending story or topic in news feed 310, a story composed in news feed 310 by a particular user (e.g., a high-profile user like the President or a celebrity), sponsored content, promoted, popular, or trending stories, content, or topics received from any suitable third-party content provider (e.g., via associated third-party system 170). Social-networking system 160 may also generate and provide instructions for automatic display of interactive element 320 to client system 130 based on social-networking information of the user. Social-networking information may include, for example and not by way of limitation, demographic information (e.g., age, gender, nationality, race, ethnicity, and locality), biographic information (e.g., name, picture, birthday, and astrological sign), preferences (e.g., music, book, movie, and food preferences), payment credentials, purchase history, loyalty points or credits, allergies and other medical information, social-graph information (e.g., social connections within a threshold degree of separation in social graph 200 and social-networking information of those connections), conversation thread history between the user and one or more other users of an online social network, search history, a history of previous interactive elements 320 manually generated by the user, any other information stored in a profile of the user on social-networking system 160, any other suitable information pertaining to the user, or any combination thereof. As an example and not by way of limitation, social-networking information may include a connection between a first node in social graph 200 corresponding to the user and a second node corresponding to a second user of the online social network or a concept. A connection (e.g., represented by an edge) between the first node and the second node may represent a particular social-networking action taken by the user with respect to the second user or content (e.g., the user has "liked" or checked-in at a page or event associated with the third-party content provider on an online social network). As another example and not by way of limitation, the social-networking information may include identifiers of one or more second users who are connected to the user in social graph 200 by a threshold degree of separation (e.g., first-degree connections may be "friends" of the first user). Social-networking system 160 may generate instructions for providing an interactive element 320 that corresponds to a post by a second user who is a first-degree connection of the user. Client system 130 may then display interactive element 320 in interface 300 to the user in response to the instructions received from social-networking system 160. Although interactive element 320 is described in a particular manner herein, interactive element 320 may correspond to any suitable content object. For example, interactive element 320 may correspond to any node in social graph 200 and may be generated automatically or manually using any suitable technique.

In particular embodiments, client system 130 may cause interactive element 320 to gradually appear (e.g., fade in), pop up immediately, slide from the position of first content object 315 in interface 300 to a particular portion of interface 300 (e.g., top left corner), appear to be dragged via user input 335 (e.g., follow path of user input 335 from first content object 315 to top right corner of interface 300), or appear in any other suitable manner. Interactive element 320 may be displayed to the user within a pre-determined amount of time after client system 130 receives the instructions from social-networking system 160 (e.g., within ten minutes, five minutes, one minute, thirty seconds, ten seconds, or in real-time), and this pre-determined amount of time may, for example, depend on the content object to which the interactive element 320 corresponds (e.g., the type or composer of content object) or a status of the client system 130 (e.g., online or in sleep mode). Although this disclosure describes providing particular interactive elements in a particular manner, this disclosure contemplates providing any suitable interactive elements in any suitable manner.

In particular embodiments, interactive element 310 may correspond to selected first content object 315. Interactive element 320 may include an image, text, any other suitable identifier of the selected content object, or any combination thereof. Interactive element 320 may be a bauble, icon, or other suitable element with which the user may interact (e.g., move or select). In the example illustrated in FIG. 3B, interactive element 320 is shown as an image of a French Bulldog, which is modified from the image of the French Bulldog in selected first content object 315. Interactive element 320 may include all or part of the content of first content object 315. Interactive element 320 may be a resized, modified, distorted, or otherwise altered view of all or part of the content of first content object element 315. Interactive element 320 may be an image, name, identifier, moniker, or any other suitable identifying information or other identifier of a composer (e.g., user or entity) of first content object 315. For example, interactive element 320 may be a profile picture of Cicero, the author or composer of first content object 315. In particular embodiments, interactive element 320 may include all of part of the content of more than one content object. Although interactive element 320 is described in a particular manner herein, interactive element 320 may be represented in any suitable manner and generated using any suitable method or technique.

Figure 3C:
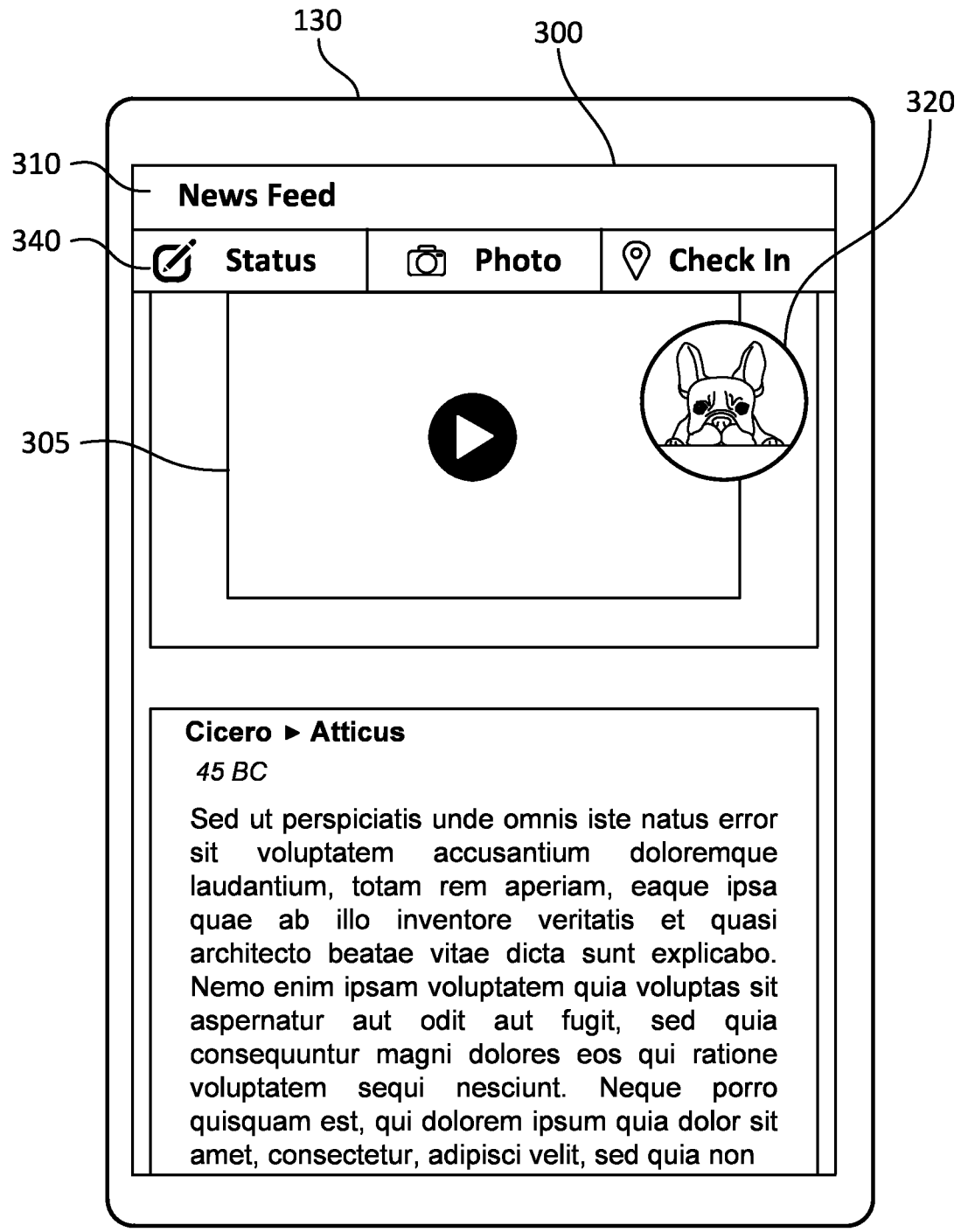
FIG. 3C illustrates an example interactive element displayed in an interface of a client system.

FIG. 3C illustrates an example interactive element 320 displayed in an interface 300 of a client system 130. Client system 130 may generate and display interactive element 320 without leaving the context (e.g., news feed 310) in which the user is browsing (i.e., without changing the application state). Interactive element 320 may persist in the portion of a display of client system 130 (e.g., a corner of interface 300) until removed from persisting (e.g., by dragging off the screen). The user may manually position interactive element 320 by, for example, dragging to a location on the display of client system 130. Interactive element 320 may persist in interface 300 of an application running on client device 130 or in any other interface or context display on client system 130. Client system 130 may automatically position interactive element 320 to avoid occluding content or icons (e.g., jewel icons). Client system 130 may automatically position interactive element 320 to cover marginal or fringe areas of certain types of content (e.g., photographs) in interface 300. In the illustrated example of FIG. 3C, interactive element 320 is positioned at the edge of interface 300, covering a marginal region of content of news feed 310 and video clip 305.

In particular embodiments, interactive element 320 may function and be displayed independent of activity of an application running on client system 130. In the example illustrated in FIG. 3C, the display of interactive element 320 does not interfere with the activity of the underlying application presented via interface 300, and the user may interact normally with interface 300. As an example and not by way of limitation, the user may scroll through news feed 310, interact with any content objects of news feed 310 (e.g., select, expand, comment on, "like," or perform any other suitable social-networking action), watch video clip 305, utilize the functions of tools 340 (e.g., post a status update, post a photograph, or check-in at a page corresponding to a location or entity), launch another application (e.g., a light weight messaging application launched via interface 300), or interact with the underlying application using interface 300 in any other suitable way. As an example and not by way of limitation, an underlying application may continue to operate without interruption if interactive element 320 is dismissed by the user. Interactive element 320 may be displayed as and/or behave as the interactive elements disclosed in U.S. patent application Ser. No. 13/685,431, "User-Based Interactive Elements," filed 26 Nov. 2012, the entirety of which is incorporated herein by reference.

Interactive element 320 may be displayed in a persistent manner. In particular embodiments, an interactive element may be displayed until client system 130 either receives user input selecting interactive element 320 or user input dismissing interactive element 320. An example of user input selecting the interactive element is discussed below in connection with FIG. 3D.

Generation and Display of Interactive Element Interfaces

Figure 3D:
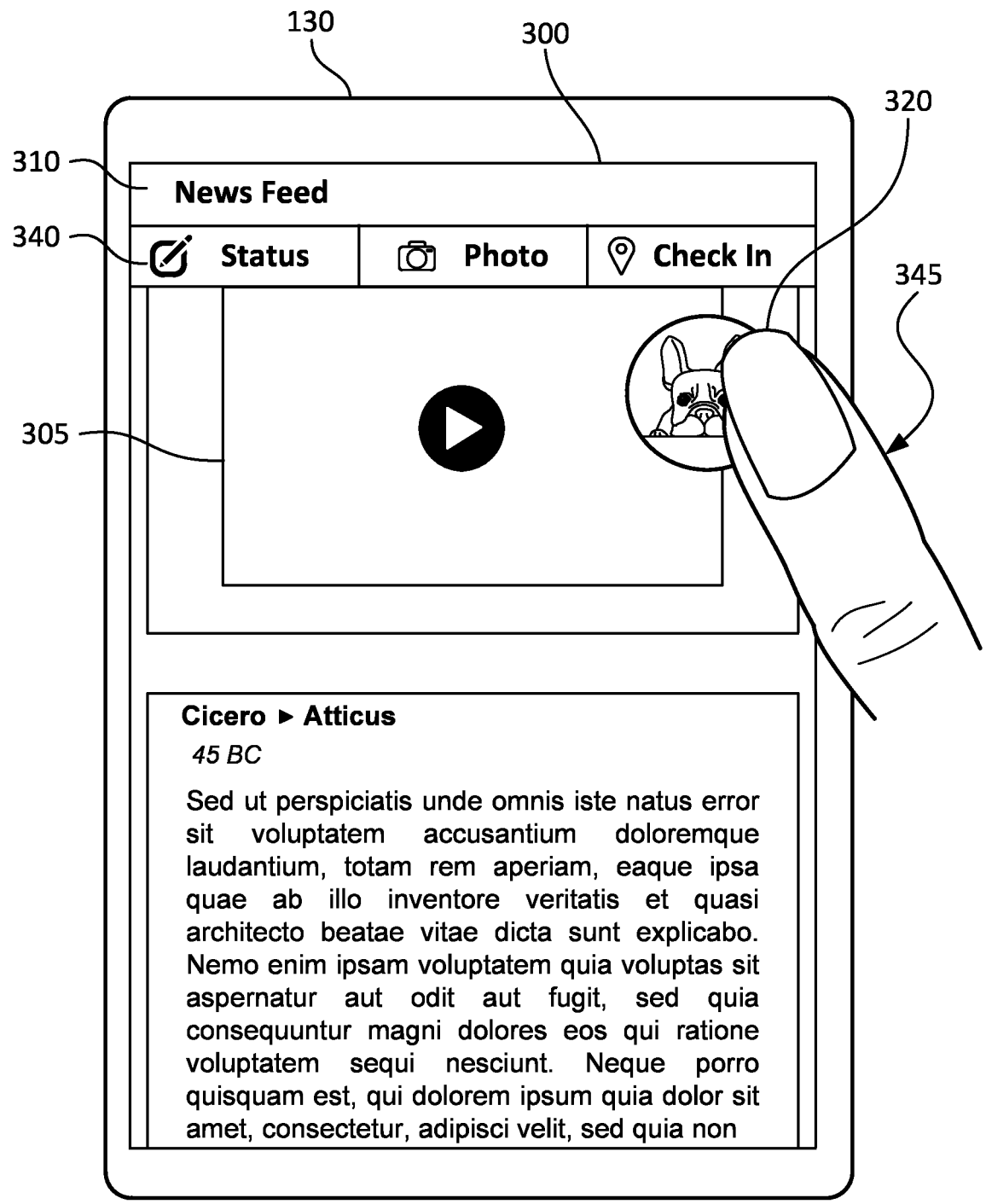
FIG. 3D illustrates example selection of an interactive element interface in an interface of a client system.

FIG. 3D illustrates example selection of an interactive element 320 in an interface 300 of a client system 130. User input 345 selecting interactive element 320 may include clicking on the interactive element (e.g., with an a mouse or a track pad), tapping the interactive element (e.g., with a stylus or a digit of the user), dragging interactive element 320, or any other suitable touch or gesture (e.g., single tap, double tap, short press, long press, slide, swipe, flip, pinch open, or pinch close). In particular embodiments, the selection of interactive element 320 (e.g., by tapping with a finger or stylus) may cause client system 130 to open an interactive element interface. The interactive element interface may provide content objects and social-networking information from news feed 310 that are related to first content object 315 and is further described below in connection with FIG. 3E. Any suitable predefined user input 345 selecting interactive element 320 may be used to open, retrieve, or otherwise cause the display of the interactive element interface. In particular embodiments, interactive element 320 corresponds to first content object 310, and an interactive element interface opened in response to user selection of interactive element 320 may include content and social-networking information related to first content object 310. In particular embodiments, interactive element 320 may correspond to one or more content objects, and the interactive element interface may include content related to the one or more selected content objects.

After an interactive element interface has been opened, any suitable user input 345, the same as or different than the user input 335 for opening the interactive element interface, may cause client system 130 to close the interactive element interface. When the interactive element interface is closed or otherwise dismissed by the user, the interactive element selected to open the interactive element interface may once again be persistently displayed to the user. Interactive element 320 may then be provided with a visual indicator that the interactive element interface has been opened. As an example and not by way of limitation, interactive element 320 may be displayed as glowing, bold, with a notification jewel, or otherwise emphasized before the interactive element interface has been opened, and after the interactive element interface has been opened and closed at least once, interactive element 320 may be provided without emphasis (e.g., not glowing or bold) or without the notification jewel. Notification jewels are further described below in connection with FIG. 4B.

Figure 3E:
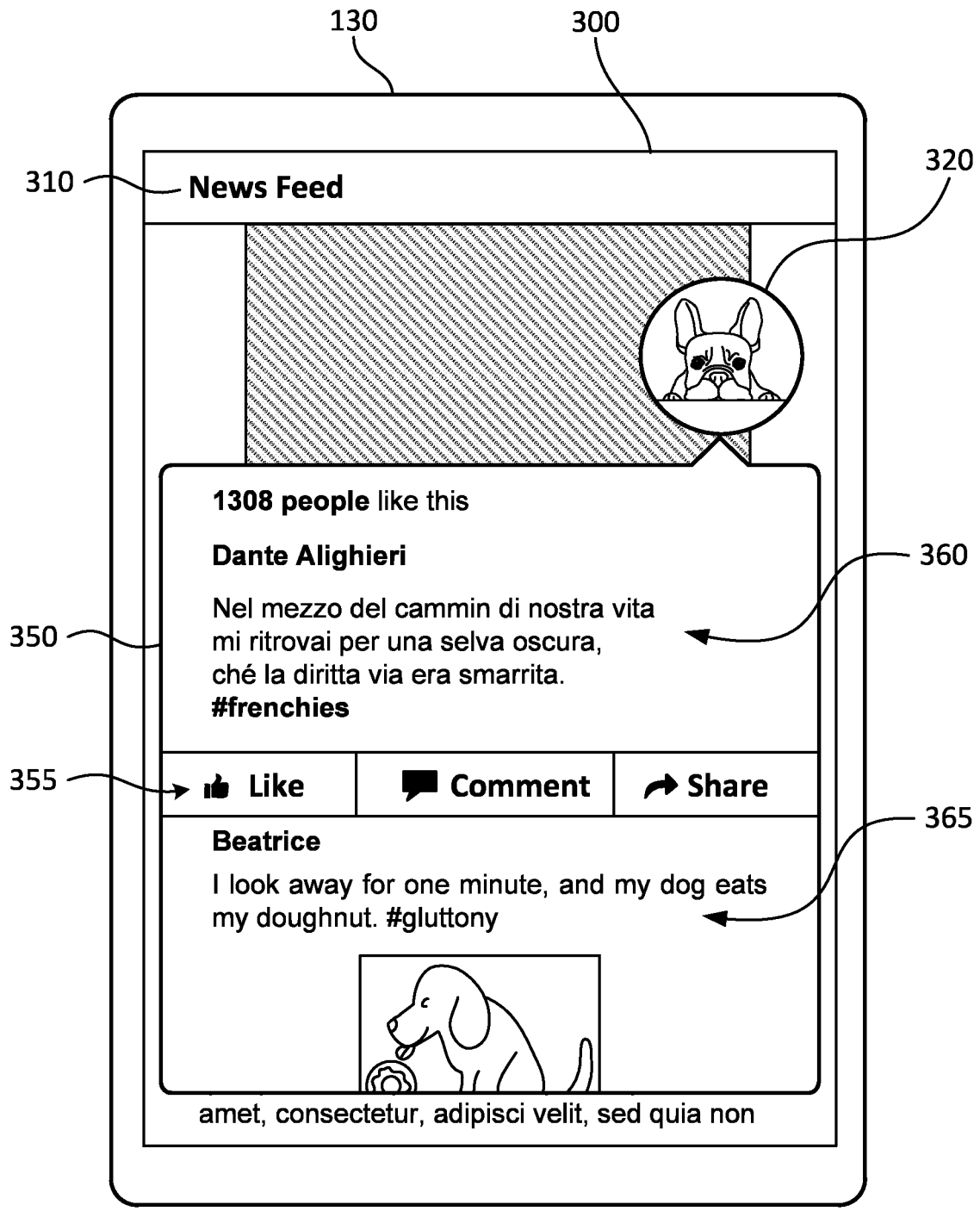
FIG. 3E illustrates an example interactive element and an interactive element interface displayed in an interface of a client system.

FIG. 3E illustrates an example interactive element 320 and an interactive element interface 350 displayed in an interface 300 of a client system 130. As described above in connection with FIG. 3D, client system 130 may cause interactive element interface 350 to be displayed in response to a user input selecting (e.g., tapping) interactive element 320. As an example and not by way of limitation, upon receipt of predefined user input, client system 130 may cause interactive element 320 to expand to reveal interactive element interface 350. Interactive element interface 350 may be displayed without leaving the context of the application (e.g., a social-networking application) in which the user is browsing or with which the user is interacting. As an example and not by way of limitation, interface 300 of an application running on client system 130 may provide news feed 310, and user selection of interactive element 320 may cause client system 130 to display interactive element interface 350 as floating on top of news feed 310. Interactive element interface 350 may be provided for persistent display independent of and without altering activity of an application running on client system 130. As another example and not by way of limitation, interactive element interface 350 may be a call-out box, pop-up window, drop-down menu, bubble, or other suitable user interface. Interactive element interface 350 may function independent of and without altering the activity of the underlying application. As an example and not by way of limitation, the user may interact normally with content objects presented in interactive element interface 350 (e.g., first content object and a set of related content objects) using the same functionality available to the user when the content objects are displayed in the background context of the application (e.g., news feed 310) via tools 355 (e.g., "like," "comment," and "share"). The user may close, collapse, or otherwise cause interactive element interface 350 to disappear by selecting or otherwise tapping interactive element 320, by selecting outside interactive element interface 350, by selecting outside interactive element interface 350 (e.g., in background context such as news feed 310), or by any other suitable user input 335 or 345.

In particular embodiments, when client system 130 receives user input 345 selecting first content object 315, client system 130 sends a request for content and social-networking information related to first content object 315 to social-networking system 160. Social-networking system 160 may generate a set of content and social-networking information that it determines to be related to first content object 315 and send the related content and social-networking information to client system 130. Social-networking system 160 may use any suitable technique for determining whether particular content and social-networking information is related to first content object 315. In particular embodiments, social-networking system 160 may first determine related content objects, and related social-networking information may be determined based on first content object 315 and the determined set of related content objects. As described above, social-networking information may include user interaction with a content object, so, for example, for a particular related content object, social-networking information may include users who have "liked" the content object, comments posted to the content object, and users who have, in turn, "liked" the comments. Social-networking system 160 may generate and send the related content and social-networking information to client system 130 automatically or in response to a request from client system 130. Client system 130 may provide received related content and social-networking information in interactive element interface 350 after receipt of user input 345 selecting interactive element 320. Related content objects may include any suitable content objects, including, as an example and not by way of limitation, content published or created by any user or entity, third-party content retrieved from or provided by third-party server 170, advertising content, custom content generated based on first content object, any other suitable content, or any combination thereof.

In particular embodiments, social-networking system 160 may identify content objects related to first content object 315 based on social-networking information associated with each of the content objects. Social-networking information may include, as an example and not by way of limitation, information pertaining to nodes and edges connecting the edges in social graph 200. As an example and not by way of limitation, the user may be represented in social graph 200 by a first node, and social-networking system 160 may determine that the set of related content objects may include content objects posted by, created by, or otherwise associated with second users represented by respective second nodes that are connected to the first node in social graph 200 (i.e., the user and the second users are direct social connections). As another example and not by way of limitation, social-networking system 160 may determine that the set of related content objects may include content objects posted by second users whose respective second nodes are connected to a node in social graph 200 representing the user who created or published first content object 315. Related content objects may also include content objects composed by users represented by nodes that are connected to the node representing the user or to the node representing the author of first content object 310 within a threshold degree of separation.

In particular embodiments, each content object may be associated with one or more attributes, and social-networking system 160 may determine that content objects related to first content object 315 may be those content objects having at least a threshold number of attributes in common with first content object 315. Attributes of content objects may include, as an example and not by way of limitation, content object identifiers (e.g., identifiers with respect to representative nodes in social graph 200), associated search terms, metadata, tags (e.g., other users tagged in a photo or mentioned in text of content objects), identifiers of authors (e.g., the names of users who composed, created, published, or shared particular content objects), locations of authors (e.g., content objects may be determined to be related to those composed by users in a particular country, state, or region), any other suitable attributes of authors (e.g., content objects posted by authors who attended the same school may be determined to be related), hashtags in the content objects (i.e., any suitable alphanumeric text string following a hash mark "#" in text of content objects), content object titles, content object topics (e.g., determined based on semantic analysis of content objects), types of content objects (e.g., texts or photos posted by users, invitations to events, third party content, and advertisements), timing (e.g., when was a content object composed, posted, or interacted with by a user), any other suitable attributes of the content objects, or any combination thereof. As an example and not by way of limitation, social-networking system 160 may determine that related content objects are those having two or more attributes in common with first content object 315. Social-networking system 160 may assign a level of significance or importance to each attribute (e.g., by assigning each attribute a weight). Social-networking system 160 may compute, for each content object, a value corresponding to a weighted combination of the attributes shared by the particular content object and first content object 315. Social-networking system 160 may determine that only content objects associated with a respective computed value greater than a predefined threshold value may be considered related content objects. So, for example, a content object having a shared hashtag with first content object 315 may be sufficient commonality for the inclusion of the particular content object in the related content objects, but another content object having only the type of content object and author identifier attributes in common (e.g., images posted to news feed 310 by the same user) may not suffice for inclusion of the other content object.

In the example illustrated in FIG. 3E, content objects related to first content object 315 and presented in interactive element interface 350 include content objects 360 and 365. Content object 360 is shown to be a post by Dante Alighieri, who may be a social graph connection of Cicero, the author of first content object 315. Content object 360 is also shown to include the hashtag "# frenchies," which is similar to the hashtag "frenchie" shown in first content object 315. In particular embodiments, social-networking system 160 may analyze each content object using natural-language processing. For example, hashtags, topics, tags, key words, search terms, and any other text in the content objects may include inflected or derived words, and social-networking system 160 may reduce text to its stem, base, or root (e.g., via stemming) before determining whether content object have related textual attributes. Thus, "# frenchies" may be deemed to be related to or matching "# frenchie." Also as illustrated in FIG. 3E, content object 365 is shown to be a post by Beatrice, who may be a friend (i.e., direct social connection in social graph 200) of Dante Alighieri, but not of Cicero (i.e., the author of first content object 315). Content object 365 is shown as including text—"I look away for one minute, and my dog eats my doughnut. # gluttony—and an image of a dog licking a doughnut. Social-networking system 160 may consider content object 365 to be related to first content object 315 because Beatrice is connected to Cicero via Dante (e.g., within two degrees of separation in social graph 200); content object 365 includes the keyword "dog," as does first content object 315; and the image of a dog in content object 365 may be associated with metadata or tags identifying the subject matter of the image. Content objects 360 and 365 and their associated attributes are presented merely as illustrative and not by way of limitation. Although attributes of content objects are described in a particular way, this disclosure contemplates any suitable attributes and any suitable methods or techniques for determining relatedness of content objects based on the attributes.

In particular embodiments, social-networking system 160 may select related content objects based on the popularity of each content object. As an example and not by way of limitation, popularity of each content object in a set of content objects (e.g., stories in news feed 310) may be determined by social-networking system 160 (e.g., based on volume or depth of user interaction with the particular content object). In the example illustrated in FIG. 3E, content object 360 is depicted as having 1308 "likes" (i.e., 1308 users of an online social network have indicated an affinity for content object 360), and social-networking system 160 may take the popularity of content object 360, as evidenced by the number of users indicating affinity for content object 360, into account when determining content object 360 is a related content object to be provided in interactive element interface 350. In particular embodiments, social-networking system 160 may select related content objects based on the popularity of an author (i.e., user) of each content object. Popularity of a particular user may be determined as compared to all or a subset of other users of the online social network. As an example and not by way of limitation, a particular user may have a large number of followers, social connections, views of a profile page associated with the user, interactions (e.g., likes or comments) on content objects composed by the user, any other suitable metric of popularity, or any combination thereof. Social-networking system 160 may rank related content objects for order of display in interactive element interface 350 based on the determined popularity of the particular content object, associated author, or both. In particular embodiments, social-networking system 160 may provide instructions to client system 130 for displaying related content objects and social-networking information in an order based on rankings. Social-networking system 160 may rank related content objects based on any suitable content object attributes, including, as an example and not by way of limitation, recency of the last user interaction with the content object or of the creation of content object. Although determining popularity of a content object or its author is described herein in a particular way, any suitable method or technique may be used to determine the popularity of a content object, its author, or both.

Social-networking system 160 may select related content objects from a set of content objects based on an affinity coefficient associated with each content object. In particular embodiments, social-networking system 160 may rank a determined set of related content objects based on an affinity coefficient associated with each related content object. The social-networking information of the user may include an affinity coefficient of a first node corresponding to the user with respect to one or more second nodes in social graph 200. As an example, the affinity coefficient may be based on one or more edges connecting the first node to one or more second nodes corresponding to content objects or authors of content objects. Affinity coefficients are described in further detail below.

In particular embodiments, social-networking system 160 may determine related content and social-networking information by generating structured queries referencing nodes of social graph 200 based on selected first content object 310. Social-networking system 160 may run the structured queries on social graph 200 in order to generate a set of results, which may be included in the set of related content objects to be presented in the interactive element interface 350. Social-networking system 160 may use the techniques and methods of generating and running structured queries disclosed in U.S. application Ser. No. 14/466,269, "Generating Cards in Response to User Actions on Online Social Networks," filed 22 Aug. 2014, the entirety of which is incorporated herein by reference.

As described above, after social-networking system 160 has selected a set of related content objects and social-networking information, either automatically or in response to a request sent from client system 130, social-networking system 160 may send the related content and social-networking information to client system 130. Client system 130 may provide first content object 315 and related content and social-networking information received from social-networking system 160 for persistent display to the user. Although this disclosure selects related content objects and social-networking information in a particular manner, this disclosure contemplates providing any suitable related content objects and/or social-networking information in an suitable manner.

Although this disclosure describes and illustrates particular embodiments of FIGS. 3A-3E as occurring being implemented in a particular way, this disclosure contemplates any suitable embodiments of FIGS. 3A-3E being implemented by any suitable platform or system. As an example, and not by way of limitation, particular embodiments of FIGS. 3A-3E may occur on an interface of social-networking system 160 and be implemented by social-networking system 160. As another example, and not by way of limitation, particular embodiments of FIGS. 3A-3E may be implemented by client system 130. Furthermore, although this disclosure describes and illustrates particular components, devices, or systems carrying out particular steps of the method of FIGS. 3A-3E, this disclosure contemplates any suitable combination of any suitable components, devices, or systems carrying out any suitable steps of the method of FIGS. 3A-3E.

Dynamically Updating Interactive Element Interfaces

Figure 4A:
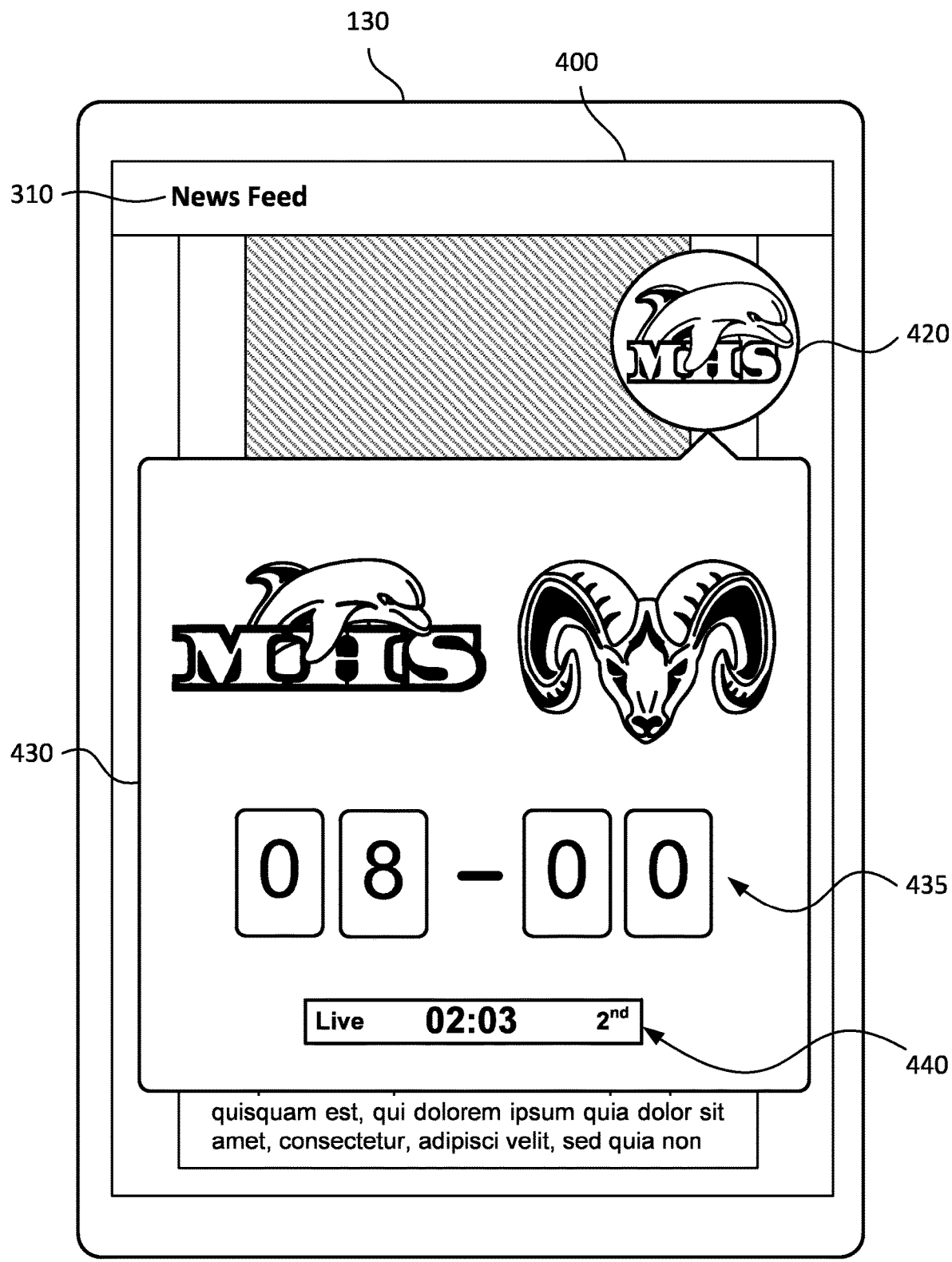
FIG. 4A illustrates an example interactive element interface and interactive element displayed on an interface of a client system.

FIG. 4A illustrates an example interactive element interface 430 and interactive element 420 displayed on an interface 400 of a client system 130. In particular embodiments, the content in an interactive element interface 430 may be dynamically updated in real time so as to provide a live feed of content associated with a selected content object (not shown). In the example illustrated in FIG. 4A, interface 400 provides news feed 310 and interactive element 420, which is depicted a Mosley High School Dolphins logo. The selected content object to which interactive element 420 corresponds may include third-party content (e.g., content of Mosley High School) provided in news feed 310 by third-party system 170 via social-networking system 160. Interactive element interface 430 is depicted as including current score 435 of an ongoing soccer game in which the Mosley High School Dolphins are playing (and defeating 8-to-0) the Rutherford High School Rams. Interactive element interface 430 may include any suitable content related to the selected content object (e.g., a post by Mosley High School showing the posture of the soccer game). As an example and not by way of limitation, interactive element interface 430 may include running game clock 440 (e.g., indicating time expired or remaining), an indication that the feed is live, the current half (or other appropriate demarcation of time within an event), a roster for each of the competing teams, including player-specific statistics and position information, a record of offenses in the game (e.g., red cards, yellow cards, penalty box minutes, players ejected from the game, or any other suitable offense information), referee information, current season information for each team (e.g., wins-losses-draws), a calendar of upcoming events (e.g., date of next game, location information indicating if it is a home or away game, next opponent information), any other suitable sporting information, or any combination thereof.

Although the content of interactive element interface 430 is described herein as being third-party content, specifically information pertaining to a sporting event, the content of interactive element interface 430 may be any suitable content that may be dynamically updated by social-networking system 160. In particular embodiments, referring now to FIG. 3E, social-networking system 160 may dynamically update the set of related content objects and social-networking information provided in interactive element interface 350. As an example and not by way of limitation, social-networking system 160 may determine that an additional content object (e.g., a new or recently composed content object) and its associated social-networking information (e.g., comments and "likes" by other users) should be included in the related content objects provided in interactive element interface 350; that the related content objects should be displayed in a different order; that new social-networking information should be included (e.g., additional users have "liked" a particular content object).

Notification Labels and Jewels for Interactive Elements

Figure 4B:
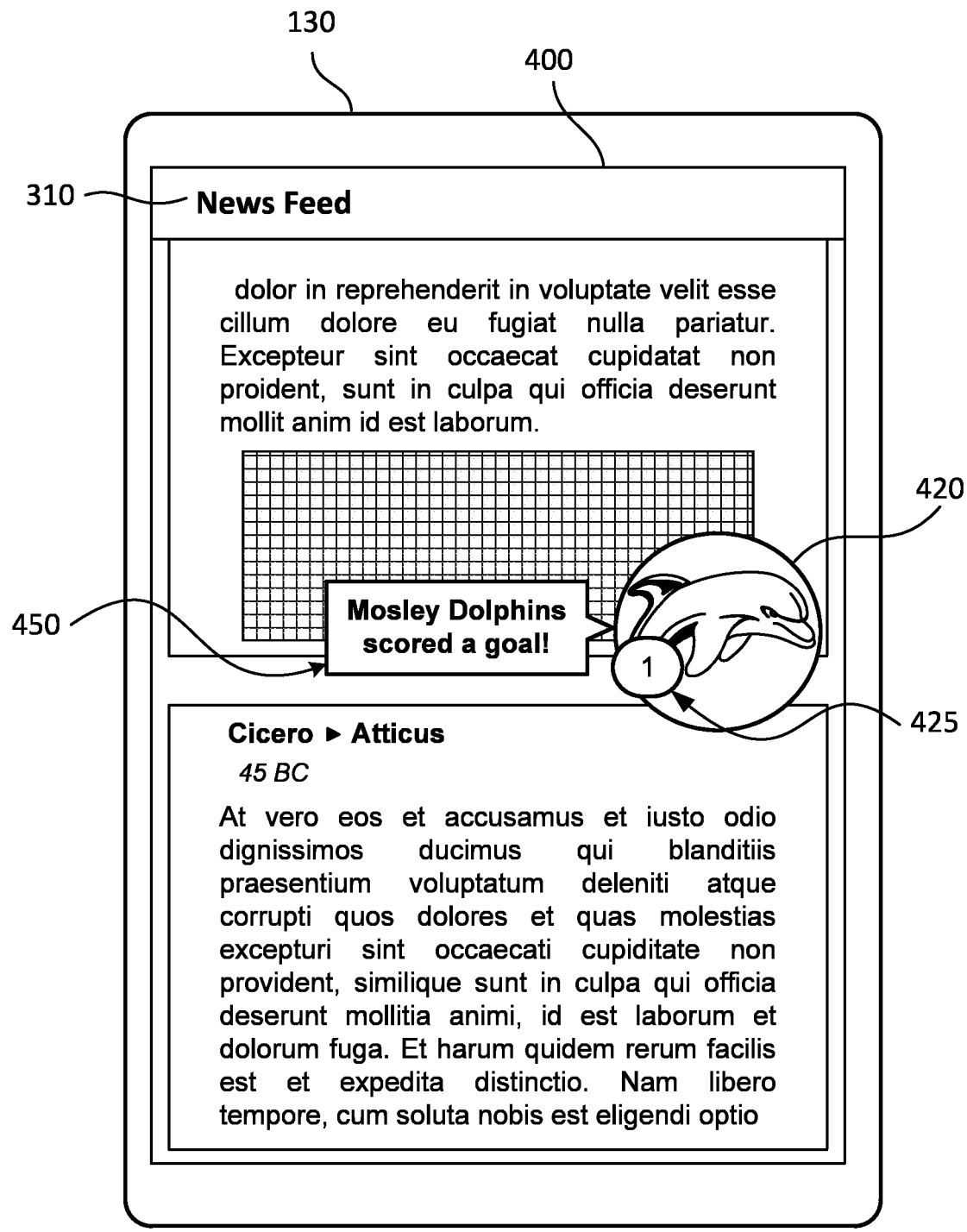
FIG. 4B illustrates an example interactive element and a notification jewel displayed on an interface of a client system.

FIG. 4B illustrates an example interactive element 420 and a notification jewel 425 displayed on an interface 400 of a client system 130. In particular embodiments, interactive element 420 may be displayed with label 450, which may provide an indication of an update to the selected content object to which interactive element 420 corresponds, the related content objects, the associated social-networking information, or any combination thereof. In the example illustrated in FIG. 4B, interactive element 420 may correspond to the Mosley High School Dolphins soccer game content object described above in connection with FIG. 4A, and social-networking system 160 may dynamically update the content object and interactive element interface 430 of FIG. 4B in the background, even while interactive element interface 430 is not open. Social-networking system 160 may, in response to updating or receiving updated content for Mosley High School Dolphins soccer game content object to which interactive element 420 corresponds, provide label 450, which may serve as a notification of the update and provide a brief description of the nature of the update (e.g., "Mosley Dolphins scored a goal!"). Similarly, interactive element 420 may include a notification jewel 425, which may provide a count of updates to related content objects or social-networking information provided in interactive element interface 430, the addition of one or more new content objects, the addition of new social-networking information, or any other suitable noteworthy event associated with interactive element interface 430. In the example illustrated in FIG. 4B, notification jewel 425 reads "1" and corresponds to the update to the Mosley High School Dolphins soccer game content object, reflecting "1" point scored by the Mosley Dolphins.

In particular embodiments, label 450 may include all or part of the content (e.g., text) of the selected content object to which interactive element 420 corresponds. In particular embodiments, interactive element 420 may be presented with label 450 as disclosed in U.S. application Ser. No. 14/098,342, "Interactive Elements with Labels in a User Interface," filed 5 Dec. 2013, the entirety of which is incorporated herein by reference.

Although this disclosure describes and illustrates particular embodiments of FIGS. 4A-4B as being implemented by social-networking system 160, this disclosure contemplates any suitable embodiments of FIGS. 4A-4B occurring on any suitable interface and as being implemented by any suitable platform or system. As an example, and not by way of limitation, particular embodiments of FIGS. 4A-4B may be implemented client system 130. Furthermore, although this disclosure describes and illustrates particular components, devices, or systems carrying out particular steps of the method of FIGS. 4A-4B, this disclosure contemplates any suitable combination of any suitable components, devices, or systems carrying out any suitable steps of the method of FIGS. 4A-4B.

Figure 5:
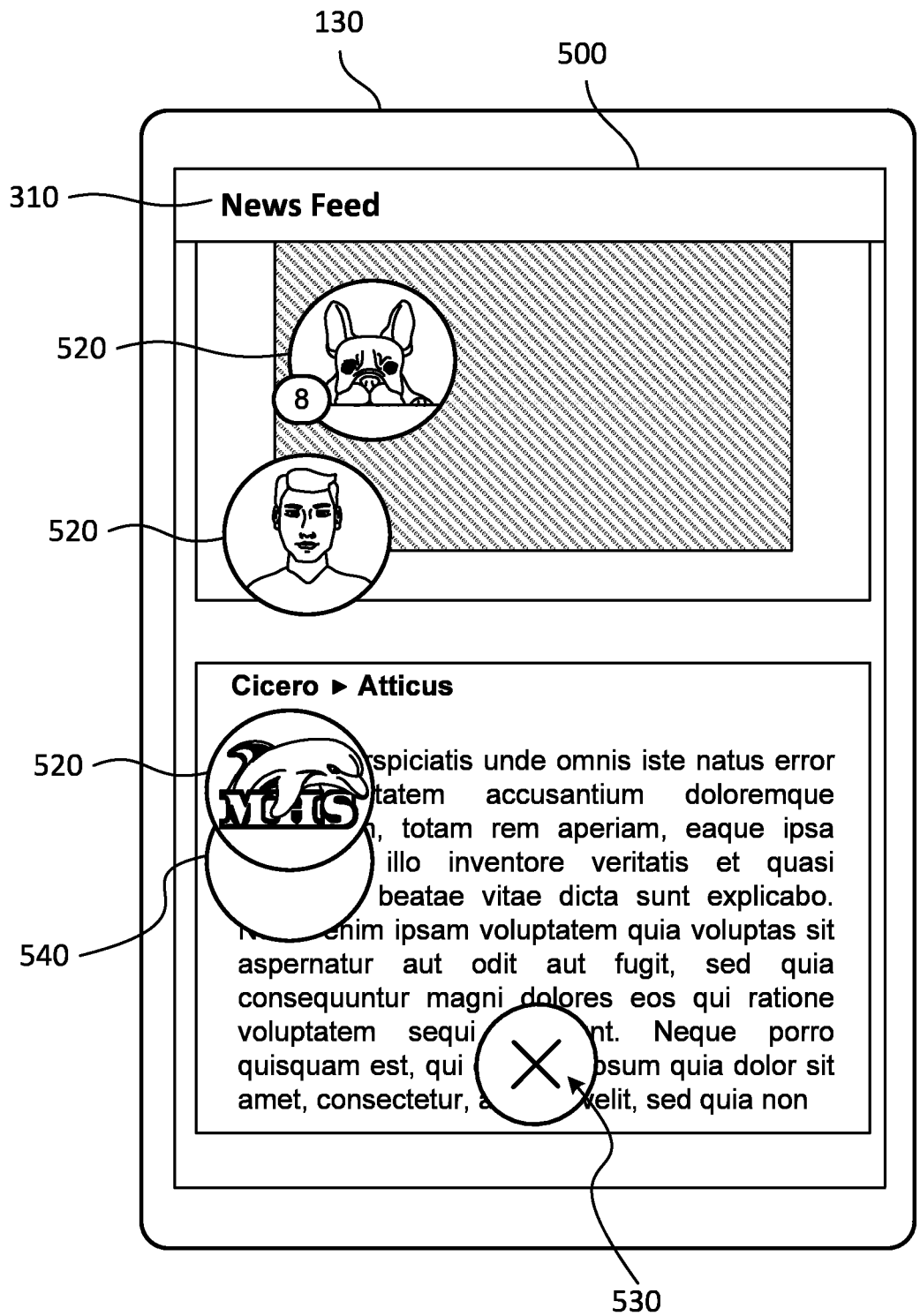
FIG. 5 illustrates an example interface and multiple interactive elements displayed on a client system.

FIG. 5 illustrates an example interface 500 and interactive elements 520 displayed on a client system 130. In particular embodiments, multiple interactive elements 520, may be generated, either automatically or in response to manual user input (e.g., user input 345), as described above. Client system 130 may provide a persistent display of any suitable number of interactive elements 520. Multiple interactive elements 520 may form a stack 540, and by tapping the top interactive element 520, the user may trigger a fan-out view of all the different interactive elements 520. In the example illustrated in FIG. 5, at least two interactive elements 520 form a stack 540, which may include any suitable number of interactive elements 520. In particular embodiments, interactive elements 520 may not be presented as a stack 540, but rather may be presented in a side bar of interface 500 or in any other suitable region of interface 500.

In particular embodiments, client system 130 may receive a particular user input that may cause interactive elements 520, or interactive element stack 540 to be repositioned (i.e., moved) for continued display in interface 500 of client system 130. For example, user input selecting (e.g., pressing) and dragging one or more of interactive elements 520 or interactive element stack 540 to a desired location on the display of client system 130 may cause client system 130 to reposition interactive elements 520 or stack 540 according to the user input.

Interactive elements 520 may be dismissed by any suitable predefined user input. As an example and not by way of limitation, the user input for dismissing interactive elements 520 may be a touch or gesture, including, for example, pressing the interactive element 520 and dragging it "off" (e.g., toward the edge of) the screen of client system 130. Upon receipt of a predefined user input dismissing interactive element 520, client system 130 may remove interactive element 520 from display at interface 500. Techniques for dismissing one or more interactive elements 520 and stacks 540, in particular, by proximity to a drop target 530, are described in further detail in U.S. application Ser. No. 14/099,561, "Dismissing Interactive Elements in a User Interface," filed 6 Dec. 2013, the entirety of which is incorporated herein by reference.

In particular embodiments, one or more interactive elements 520 may be displayed in a landing view or a drawer view, which may be displayed independent of and without altering the activity of an underlying application running on client device 130. Client system 130 may open the landing view in response to any suitable predefined user input, including, for example, a touch gesture of swiping up from the bottom of the screen. In particular embodiments, the landing view may include any suitable number of automatically-generated interactive elements 520 (i.e., generated by social-networking system 160 automatically and not in response to any received user input). A user may drag one or more of interactive elements 520 from the landing view to the rest of interface 500 (e.g., a region over news feed 310), where each may persist individually until selected or displayed, as described above. In particular embodiments, a user may save a particular content object for later viewing or reference by generating an interactive element 520 corresponding to the particular content object. A user may add interactive elements 520 to the landing view using any suitable user input (e.g., by user input dragging the interactive elements 520 into an open landing view). In this manner, the user may save a particular content object as an interactive element 520, which may be stowed off-screen until recalled via specific user input opening the landing view.

In particular embodiments, interactive elements 520 may correspond to sponsored content (e.g., associated with a third-party content provider). Social-networking system 160 may generate interactive elements 520 based on third-party content received from third-party system 170. In particular embodiments, social-networking system 160 may generate an interactive element 520 corresponding to sponsored content based on the user's interactive element history (e.g., the particular interactive elements 520 created by and interacted with by the user and the particular automatically-generated interactive elements 520 with which the user has interacted. As an example and not by way of limitation, if a user generates an interactive element 520 for a Golden State Warriors basketball game, social-networking system 160 may push an interactive element 520 corresponding to a promotional offer to purchase discounted tickets for an upcoming Golden State Warriors game.

In particular embodiments, the user may control the content for which interactive elements 520 may be automatically generated, the particular related content that may be included in interactive elements 520 (and the corresponding interactive element interface), and the particular interactive elements 520 in which the user's content (e.g., composed, published, or shared by the user) may be included via preference settings on client device 130. In particular embodiments, the user may set preferences or privacy settings via social-networking system 160. For example, the user may specify in the types of information or events for which the social-networking system 160 may automatically generate interactive elements 520 (e.g., content objects composed by or otherwise associated with direct social connections or connections within a threshold degree of separation, breaking news, emergency alerts may be allowed, whereas advertisements and unsolicited third-party content may be disallowed). In particular embodiments, a user may set limits on the frequency of automatically-generated interactive elements 520 (e.g., specify a max number over a predefined period of time), specify the way in which automatically-generated interactive elements 520 may be presented (e.g., only in the landing view, not as a stand-alone interactive element 520 floating over the underlying application), allow or disallow the presentation of labels 450, notification jewels 425, specify the particular content that may trigger the display of labels 450 and notification jewels 425, or any other suitable preferences associated with the display, function, or content of interactive elements 520.

Figure 6:
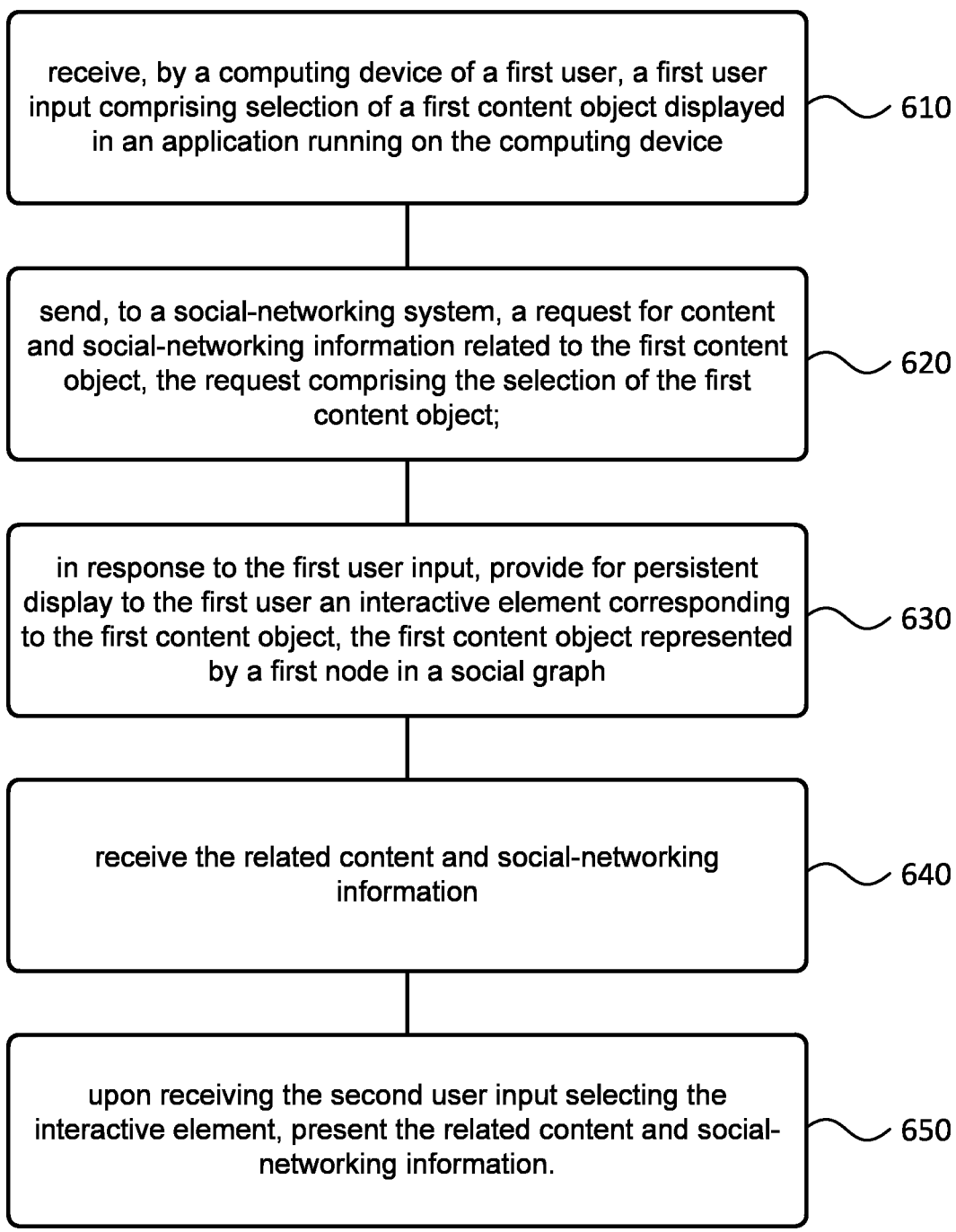
FIG. 6 is a flowchart illustrating an example method for providing an interactive element.

FIG. 6 illustrates an example method 600 for providing an interactive element. The method may begin at step 610, where client system 130 of a first user of an online social network may receive a first user input comprising selection of a first content object displayed in an application running on client system 130. At step 620, client system 130 may send, to social-networking system 160, a request for content and social-networking information related to the first content object, the request comprising the selection of the first content object. At step 630, client system 130 may, in response to the first user input, provide for persistent display to the first user an interactive element corresponding to the first content object, the first content object represented by a first node in a social graph associated with the social-networking system, wherein the interactive element is displayed independent of and without altering activity of the application, and the interactive element is displayed until client system 130 receives a second user input selecting the interactive element or a third user input dismissing the interactive element. At step 640, client system 130 may receive the related content and social-networking information. At step 650, client system 130 may receive the second user input selecting the interactive element, presenting the related content and social-networking information. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for providing an interactive element including the particular steps of the method of FIG. 6, this disclosure contemplates any suitable method for providing an interactive element including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503093, filed 11 Aug. 2006, U.S. patent application Ser. No. 12/977027, filed 22 Dec. 2010, U.S. patent application Ser. No. 12/978265, filed 23 Dec. 2010, and U.S. patent application Ser. No. 13/632869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVP'ing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 7:
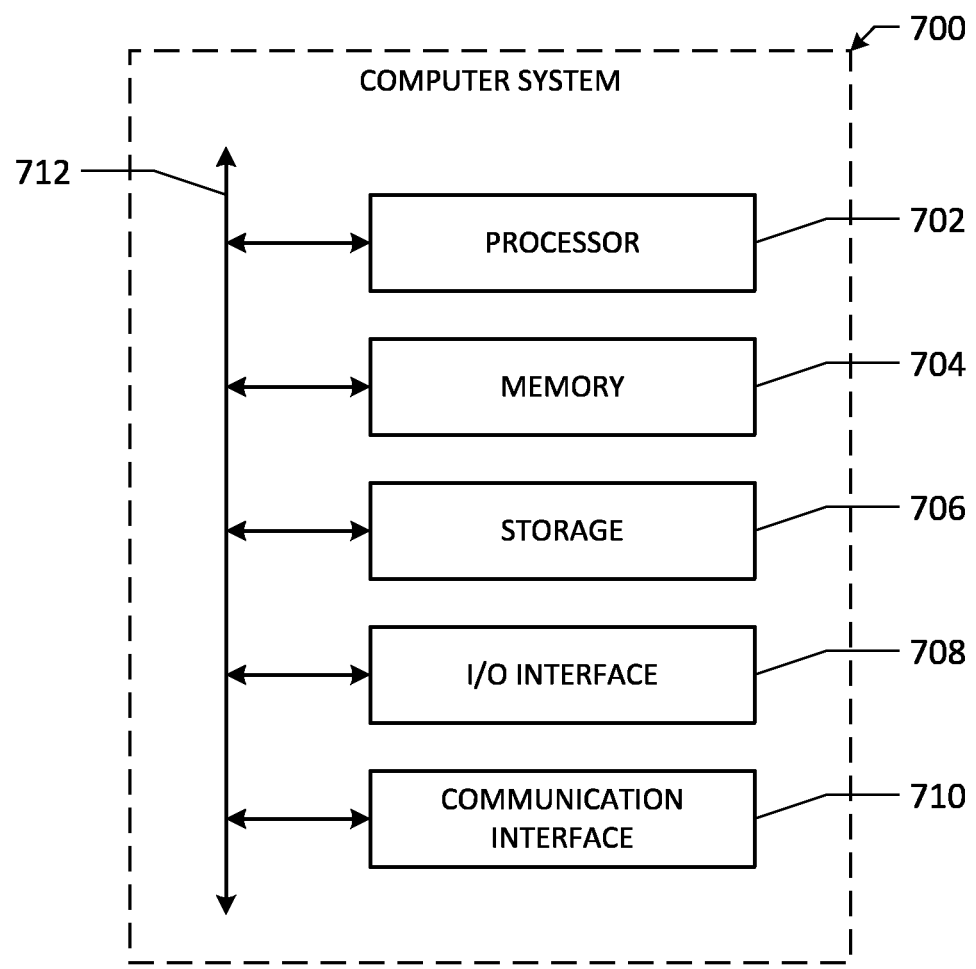
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a computing device of a first user of a social-networking system, determining a selection of a first content object in an application running on the computing device;
    by the computing device, in response to the selection, providing for persistent display to the first user an interactive element corresponding to the first content object, the first content object representing a first node in a social graph associated with the social-networking system and being authored by a second user represented by a second node connected to the first node, wherein the interactive element is persistently displayed until the computing device receives a first user input selecting the interactive element or a second user input dismissing the interactive element, and wherein the interactive element is configured to dynamically update as social-networking information is received in real time;
    by the computing device, upon receiving the first user input selecting the interactive element, selecting one or more second content objects determined to be related to the first content object, wherein:
        each of the second content objects is authored by a third user represented by a third node in the social graph; and
        each of the second content objects is selected and determined to be related to the first content object based on the third node representing the third user authoring the second content object being connected to the second node representing the second user authoring the first content object in the social graph; and by the computing device, providing for display to the first user, in association with the interactive element, an interactive element interface comprising the one or more selected second content objects and social-networking information determined to be related to the first content object, wherein the interactive element interface is dynamically updated while provided for display, and wherein the interactive element is configured to:

dismiss the interactive element interface upon receiving the second user input dismissing the interactive element, and provide for persistent display to the first user a second interactive element corresponding to the second content object upon receiving a third user input selecting one of the second content objects from the interactive element interface and moving it outside of the interactive element interface.

2. The method of claim 1, wherein the selection is determined based on instructions received from the social-networking system.

3. The method of claim 1, wherein the selection is determined based on a fourth user input received at the computing device of the first user, the fourth user input comprising selection of the first content object.

4. The method of claim 1, wherein the providing the interactive element interface comprises opening the interactive element interface and enabling the first user to interact with the first content object and the second content objects and social-networking information, and wherein the interactive element interface functions and is displayed independent of and without altering an activity of the application.

5. The method of claim 4, further comprising:
by the computing device, receiving the second user input dismissing the interactive element interface; and
by the computing device, in response to the second user input:
closing the interactive element interface; and
returning to the application, the activity of the application unaltered by the first user input or the second user input.

6. The method of claim 4, wherein each of the second content objects is represented by a respective fourth node in the social graph that is connected to the first node.

7. The method of claim 6, wherein each of the second content objects included in the related content is identified based on an affinity between the second content objects and the first content object.

8. The method of claim 6, wherein the social-networking information comprises social-networking information associated with the one or more second content objects.

9. The method of claim 6, further comprising:
receiving updated social-networking information in real time as the updated social-networking information is received by the social-networking system; and
dynamically updating the interactive element interface with the updated social-networking information.

10. The method of claim 9, wherein the first content object comprises a live feed of third-party content, and wherein the dynamically updating comprises:
retrieving updated third-party content from a third-party system; and
updating the first content object based on the updated third-party content.

11. The method of claim 1, wherein the social graph comprises a plurality of nodes and a plurality of edges connecting the nodes, each of the edges between two of the nodes representing a single degree of separation between them, a particular node corresponding to the first user, wherein each third user is connected to the first user in the social graph by a threshold degree of separation.

12. The method of claim 1, wherein the first content object and at least one of the second content objects comprise stories in a feed of the first user, the feed generated by the social-networking system.

13. The method of claim 1, further comprising:
by the computing device, receiving the second user input dismissing the interactive element; and
by the computing device, in response to the second user input, removing the interactive element from display to the first user.

14. The method of claim 1, wherein the interactive element is automatically generated and provided for persistent display to the first user without any user input being received at the computing device.

15. The method of claim 1, wherein the interactive element interface further comprises a notification jewel, the notification jewel providing a count of updates to one of the second content objects.

16. The method of claim 15, wherein the notification jewel further provides a count of new second content objects.

17. One or more computer-readable non-transitory storage media embodying software that is operable when executed to:
determine a selection of a first content object in an application running on a computing device;
in response to the selection, provide for persistent display to a first user an interactive element corresponding to the first content object, the first content object representing a first node in a social graph associated with a social-networking system and being authored by a second user represented by a second node connected to the first node, wherein the interactive element is persistently displayed until the computing device receives a first user input selecting the interactive element or a second user input dismissing the interactive element, and wherein the interactive element is configured to dynamically update as social-networking information is received in real time;
upon receiving the first user input selecting the interactive element, select one or more second content objects determined to be related to the first content object, wherein:
each of the second content objects is authored by a third user represented by a third node in the social graph; and
each of the second content objects is selected and determined to be related to the first content object based on the third node representing the third user authoring the second content object being connected to the second node representing the second user authoring the first content object in the social graph; and
provide for display to the first user, in association with the interactive element, an interactive element interface comprising the one or more selected second content objects and social-networking information determined to be related to the first content object, wherein the interactive element interface is dynamically updated while provided for display, and wherein the interactive element is configured to:
dismiss the interactive element interface upon receiving the second user input dismissing the interactive element, and
provide for persistent display to the first user a second interactive element corresponding to the second content object upon receiving a third user input selecting one of the second content objects from the interactive element interface and moving it outside of the interactive element interface.

18. The media of claim 17, wherein the selection is determined based on instructions received from the social-networking system.

19. The media of claim 17, wherein the selection is determined based on a fourth user input received at the computing device of the first user, the fourth user input comprising selection of the first content object.

20. A system comprising: one or more processors; and a memory coupled to the processors comprising instructions executable by the processors, the processors operable when executing the instructions to:
determine a selection of a first content object in an application running on a computing device;
in response to the selection, provide for persistent display to a first user an interactive element corresponding to the first content object, the first content object representing a first node in a social graph associated with a social-networking system and being authored by a second user represented by a second node connected to the first node, wherein the interactive element is persistently displayed until the computing device receives a first user input selecting the interactive element or a second user input dismissing the interactive element, and wherein the interactive element is configured to dynamically update as social-networking information is received in real time;
upon receiving the first user input selecting the interactive element, select one or more second content objects determined to be related to the first content object, wherein:
each of the second content objects is authored by a third user represented by a third node in the social graph; and
each of the second content objects is selected and determined to be related to the first content object based on the third node representing the third user authoring the second content object being connected to the second node representing the second user authoring the first content object in the social graph; and
provide for display to the first user, in association with the interactive element, an interactive element interface comprising the one or more selected second content objects and social-networking information determined to be related to the first content object, wherein the interactive element interface is dynamically updated while provided for display, and wherein the interactive element is configured to:
dismiss the interactive element interface upon receiving the second user input dismissing the interactive element, and
provide for persistent display to the first user a second interactive element corresponding to the second content object upon receiving a third user input selecting one of the second content objects from the interactive element interface and moving it outside of the interactive element interface.

* * * * *